United States Patent

[11] 3,612,617

| [72] | Inventor | Karl Scherz<br>Hauptplatz 7, Deutschlandsberg, Austria |
|---|---|---|
| [21] | Appl. No. | 841,854 |
| [22] | Filed | July 15, 1969 |
| [45] | Patented | Oct. 12, 1971 |
| [32] | Priority | July 19, 1968 |
| [33] | | Austria |
| [31] | | A 6960/68 |

[54] TOP-UNLOADED SILO
14 Claims, 15 Drawing Figs.

[52] U.S. Cl. .................................................. 302/56,
214/DB, 99/235
[51] Int. Cl. ..................................................... B65g 53/40,
A01f
[50] Field of Search ........................................... 99/234,
235; 34/189, 209, 236; 214/17.84; 302/56

[56] References Cited
UNITED STATES PATENTS

| 2,430,203 | 11/1947 | Bailey | 214/17.84 |
| 2,595,333 | 5/1952 | Clapp | 302/56 |
| 2,864,655 | 12/1958 | Caron | 302/56 |
| 2,963,327 | 12/1960 | Seymour et al. | 302/56 |
| 3,144,143 | 8/1964 | Wilkes | 214/17.84 |
| 3,193,058 | 7/1965 | Ebbinghaus | 99/235 S X |
| 3,235,102 | 2/1966 | Chapman | 214/17.84 |

*Primary Examiner*—Paul R. Gilliam
*Attorney*—Kurt Kelman

ABSTRACT: A silo has a sidewall which is adapted to hold silage. Top unloading apparatus comprises a plate support adapted to rest on said silage and having an aperture, a conveyor having a carrier which is connected to the top of said plate support for limited pivotal movement relative thereto in all directions and for rotation with said plate support, and conveying means carried by said carrier and extending through said aperture to said silage, conveyor drive means operable to cause said conveying means to remove material from said silage and move said removed material toward said axis, a guide spider which is disposed above said conveyor and vertically guided on the inside surface of said sidewall and provided with means holding said spider in a horizontal orientation and with a bearing, in which said conveyor carrier is mounted for rotation about said axis, a horizontal drive ring centered on the axis of said silo, and rotating drive means operable to rotate said carrier and plate support about the axis of said silo and comprising a pinion in rolling engagement with said drive ring.

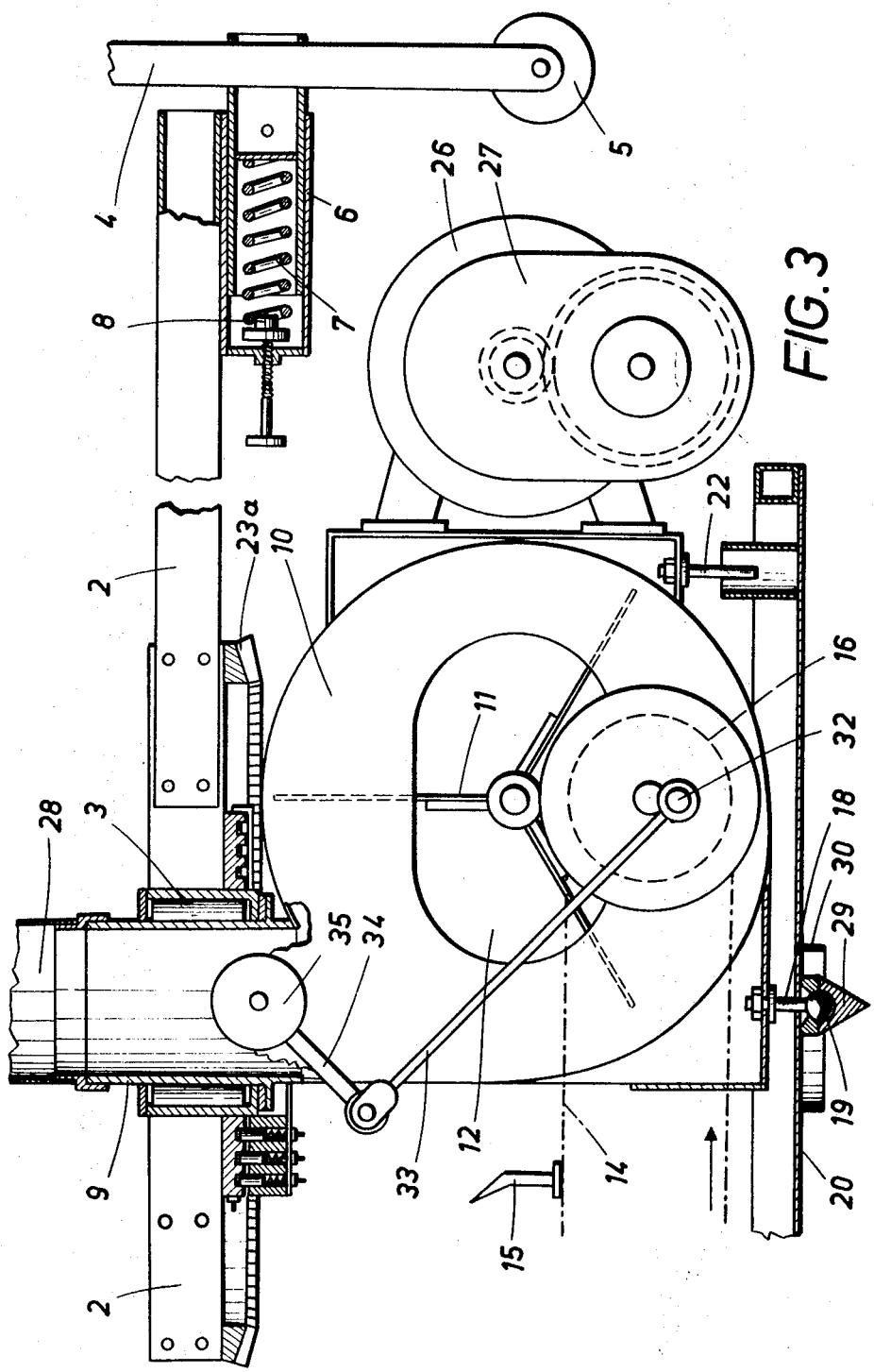

PATENTED OCT 12 1971 3,612,617

INVENTOR.
KARL SCHERZ
BY [signature]
AGENT

INVENTOR.
KARL SCHERZ

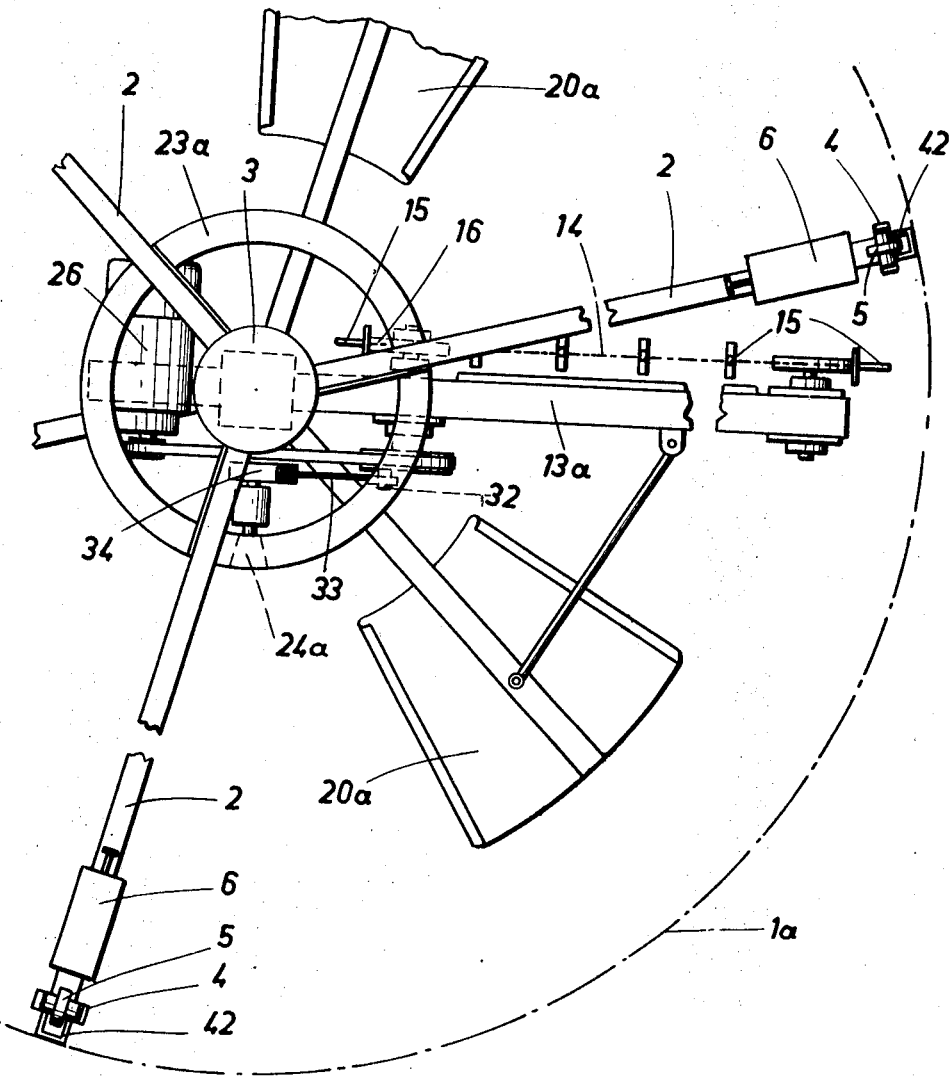

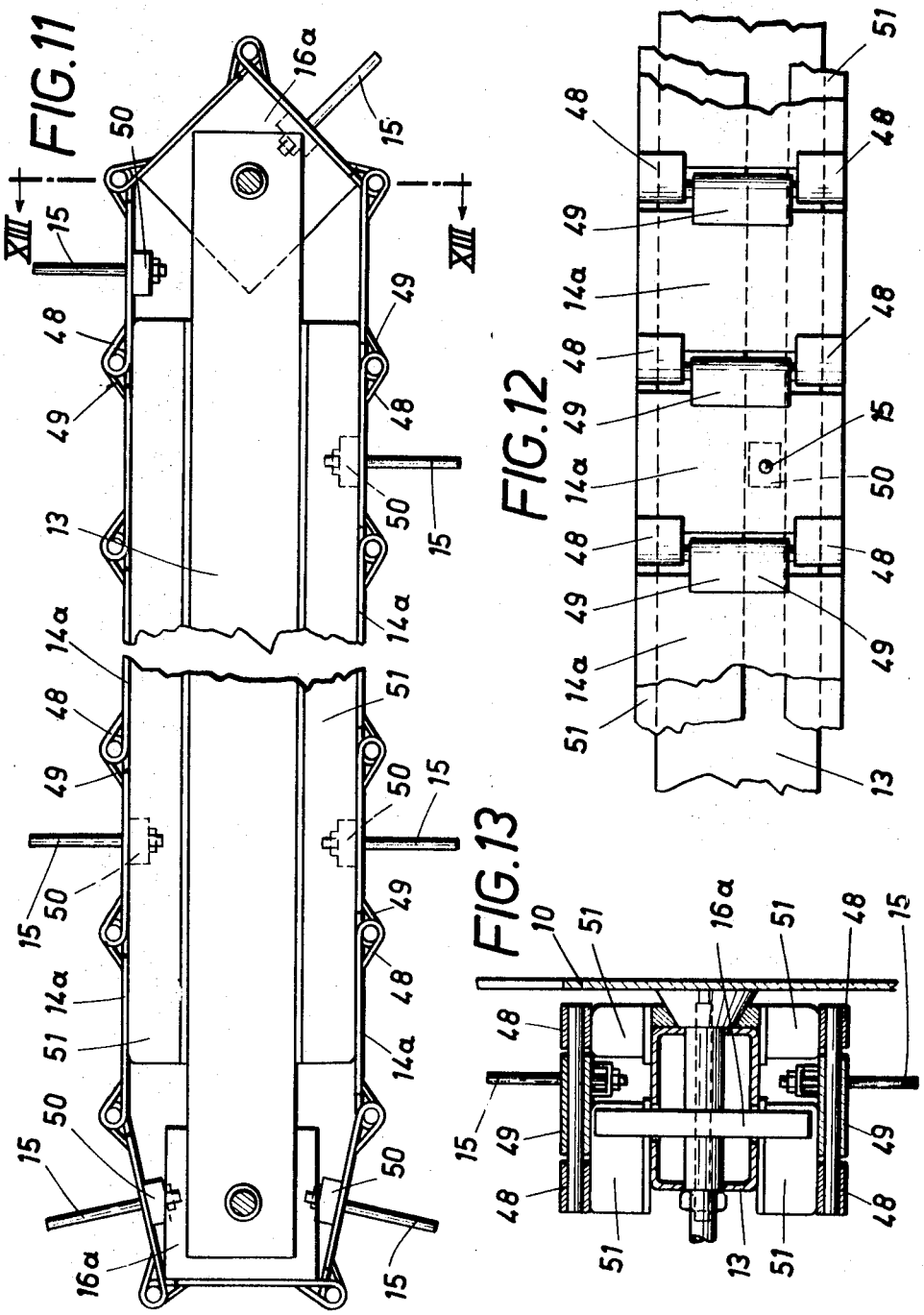

INVENTOR.
KARL SCHERZ

TOP-UNLOADED SILO

This invention relates to a top unloading apparatus for silos for silage and hay towers, which apparatus comprises a conveyor, which rotates about the axis of the silo or tower and removes the material from the surface of the material in storage and delivers it inwardly toward the region of the axis or to an upwardly ejecting central blower which rotates in unison with the conveyor.

Previously known top unloading apparatus comprise drive rollers which roll on the surface of the silage and impart to the conveyor and blower a rotational movement about the axis of the silo. The material which has been removed by the conveyor is ejected by the blower through an ejecting pipe, which extends out through a selected one of the discharge doors provided one over the other in the sidewall of the silo. To ensure rotation about the axis of the silo, guide rollers are provided, which roll on the sidewall of the silo during the rotation of the conveyor and pipe. Apparatus of this type have various disadvantages. Because the rotation is effected by the rolling of the drive rolls on the surface of the material in storage and the material in storage often varies in density, the conveyor may not uniformly remove the material in storage and the rotational feed may be irregular so that the entire apparatus assumes an inclined position and a gyratory movement is no longer ensured. If the conveyor has a particularly strong inclination, it may even damage the wall of the container, particularly if the silo is made from plastics material which is reinforced with glass fibers. It will make no difference in this connection whether the conveyor consists of an endless chain which is set with teeth or of a milling screw.

It is an object of the invention to eliminate these disadvantages and provide an apparatus in which the horizontal orientation of the parts which rotate about the central axis is always ensured, the material in storage remains constantly covered without a clearance, the structure can be simplified and the reliability of operation is increased, and basically the same structure can be used in hay towers.

This object is accomplished according to the invention essentially in that a guide frame is provided above the conveyor and is guided by the sidewall of the silo or tower for displacement only in a vertical direction while maintaining a horizontal position, the frame forms the bearing for the rotatable mounting of the carrier of the conveyor or of the neck of the blower housing connected to the carrier of the conveyor, the frame together with these parts of the apparatus rests on a plate support, which rests on the material in storage and has an aperture through which the conveyor can extend to the surface of the material in storage, the plate support rotates with the conveyor about the axis of the silo or tower and is pivoted to the carrier or blower housing by a universal joint for a limited movement in all directions, and the guide frame carries a gear or friction ring, which is engaged by a driven pinion or friction wheel, which is connected to the carrier or blower housing. Because the guide frame can be lifted and lowered in the silo or hay tower but cannot rotate about the axis of the silo or tower and cannot become inclined, the frame will always ensure a horizontal orientation of the conveyor and blower regardless whether the surface of the material in storage is horizontal or inclined or uneven. Nevertheless, the entire apparatus can be supported by the material in storage because the plate support is capable of a limited pivotal movement in all directions relative to the remaining parts of the apparatus and can thus assume any inclination which may be imposed by the surface of the material in storage. If the surface of the material in storage deviates from a horizontal plane at the beginning of the operation, material will be removed from storage initially only at the higher portions until the material in storage has a horizontal surface. Thereafter, material will be removed uniformly throughout the surface of the material in storage. Hence, the inclination of the conveyor cannot increase in operation and the conveyor cannot ultimately contact the wall of the silo. Because the entire apparatus rests on the plate support and the latter rests on the material in storage, there is no need for a separate lowering apparatus or automatic lowering device having parts which are liable to be deranged and which add to the structural expenditure. The rotation about the axis of the silo or tower might be imparted to the conveyor by a roller or the like which rolls on the surface of the material in storage. It will be more desirable, however, to provide a drive means which is entirely independent of the material in storage and of its varying density and which comprises a gear or friction ring on the guide spider and a pinion or friction wheel rolling on that ring. The apparatus having the basic structure which has been described is suitable for silos for silage and for hay towers having a central dropping well. In the latter case, it is sufficient to remove the blower so that the conveyor does not deliver the removed material to the blower but simply drops it into the well. In that case the plate support must have a central aperture corresponding to the well so that the plate support is annular or the plate support must be divided into segments.

It will be desirable to provide a separate motor for driving the blower. When the apparatus is deenergized in such an arrangement, the blower wheel will continue to rotate for some time owing to its inertia so that the material which is in the discharge duct or hose of the blower will be ejected and will not fall back into the blower housing. This could lead to difficulties when the apparatus is subsequently started.

The plate support may be connected to the blower housing for relative adjustment in a vertical direction so that the depth of penetration of the conveyor into the material in storage may be varied according to requirements.

In a development of the invention, the guide frame has a plurality of radial arms, and two vertically spaced rollers rotatable on horizontal axes are mounted at the free end of each of said arms and are preferably urged radially outwardly by spring force. This arrangement will ensure that the guide spider has a horizontal orientation. Because the rollers are urged against the sidewall of the silo or tower, the guide frame can take up the reaction force which is due to the driving force producing the rotation. The radial arms of the guide spider may be adjustable in length to enable an adaptation to different diameters of the silo or tower.

To ensure a constant covering of the material in storage without a clearance, so that the material is protected against an access of air and deterioration, an annular flexible cover or tarpaulin is secured to the outer edge of the plate support and tightly engages a cover of the conveyor and is adapted to be stretched like an umbrella by telescopic ribs, which are extended by spring pressure, so that the rim of the flexible cover engages the sidewall of the silo. Alternatively, the plate support, which may be composed of a plurality of sectors, may extend throughout the cross section of the silo and may carry an elastic profiled sealing edge potion, if desired.

When the apparatus is used in silos for silage, it will be desirable to provide the plate support on the underside with a centering spike, which is preferably continued by a spirally curved web, which during the rotation of the plate support pushes the material from the central region into the range of the conveyor so that the material is also removed as required from the central region which is not reached by the conveyor itself.

In accordance with the invention, a sharp-edged, inclined precutting disc is mounted on the outer end of the conveyor and has a crowned surface hugging the wall of the silo or tower. Owing to its shape and angle, this precutting disc is automatically urged against the sidewall of the silo during the rotation of the conveyor about the axis of the tower or silo and pushes the material from the sidewall of the silo to the conveyor. Because the sidewall of the silo or tower deviates in most cases somewhat from a circle, the outer end of the conveyor must be spaced from that wall. The precutting disc ensures that the material is removed as far as to the wall in spite of that spacing. The removal of material close to the wall is important because a tight contact between the flexible covering or plate support and the wall could not otherwise be achieved.

In the previous arrangements, the relation of the chain conveyor to the blower is such that the direction of travel is parallel to the axis of the blower wheel and the lower course of the chain delivers the material directly into the inlet of the blower. It has been found, however, that the handling action of the blower will be improved if the chain conveyor is disposed beside the blower housing and has a direction of travel which is transverse to the axis of the impeller of the blower. In this case, the material which has been delivered to the center of the silo by the lower course of the chain is raised and moved about the reversing sprocket within a guard and is laterally delivered into the inlet of the blower adjacent to the upper course of the chain. Hence, the material which is delivered is centrally sucked by the blower whereas it was previously necessary to arrange the inlet of the blower in an undesirable position at the edge of the blower housing.

As a result of the special delivery of the material to the blower, the latter may be so designed and dimensioned that the material can be upwardly ejected over the top rim of the silo even when the apparatus is in its lowermost position so that there is no need for doors in the sidewall of the silo and the farmer need not enter the silo to reposition the apparatus from one door to another. Hence, the blower is provided for the ejection of the material with a flexible tube or a telescopic tube which extends over the top rim of the silo.

The blower housing may be inclined from its neck, which is rotatably mounted in the bearing carried by the guide spider, and the axes of the driving or reversing pulleys of the chain conveyor or the like may have the same inclination as the axis of the impeller of the blower. This arrangement has the advantage that the teeth of the chain conveyor reach the center under the blower neck so that there is no need to provide a centering spike and a spiral web and a more favorable movement of the teeth results.

Alternatively, the conveyor may consist of metal slats, which are hinged together by hinge eyes disposed on the outside. In this case, the driving and reversing pulleys may consist of square discs having a side length which is equal to the slat length. Such conveyor virtually constitutes in a desirable manner a closed belt conveyor, and the hinge eyes disposed on the outside serve as flights for the material to be conveyed. Owing to the relatively large pitch of the conveyor elements, the number of hinges, which are subjected to wear, is much improved, so that any elongation of the conveyor will also be reduced. As a result, the number of chain sprockets or the like can be reduced and the square discs will be sufficient to drive and reverse the conveyor. The slats are made from stainless steel so that there is no danger of corrosion.

According to the invention, alternate slats of this conveyor carry on the inside a U-shaped guide extension, in which a tooth is held, which extends through the plate, and said extension is movable between guide bars, which are mounted on the carrier of the conveyor. Hence, a good guidance of the slat is ensured in spite of the use of the simple discs as driving and reversing pulleys and there will be a desirable mounting of the teeth because the same can be supported both in the slats and in the web of the guide extensions. Besides, the guide extensions result in a good stiffening of the slats which carry the teeth. The teeth serve to tear up the surface of the material in storage and the hinge eyes act subsequently as flights carrying the material along.

In the modification for use in a hay tower, the carrier of the conveyor consists of a shaft, which is mounted in a guide spider, and of a radially extending arm, which is detachably connected to the shaft and to which the driving and reversing pulleys of the chain conveyor are secured and to which the drive motor is detachably secured. The arm can be replaced by a distributor for delivering material into the hay tower when the guide spider is held in position in the upper portion of the tower. In that case, the motor removed from the arm may be used to drive the distributor.

The invention is illustrated by way of example in the drawing, in which

FIG. 3 is an enlarged view, partly in section, showing a modification.

FIGS. 9 and 10 are, respectively, a side elevation and an enlarged top plan view showing an apparatus intended for use in a hay tower.

FIG. 11 is a side elevation showing a different embodiment of the conveyor.

FIG. 12 is a top plan view showing the conveyor of FIG. 11.

FIG. 13 is a sectional view taken on line XIII—XIII of FIG. 11 and

Figure 1:
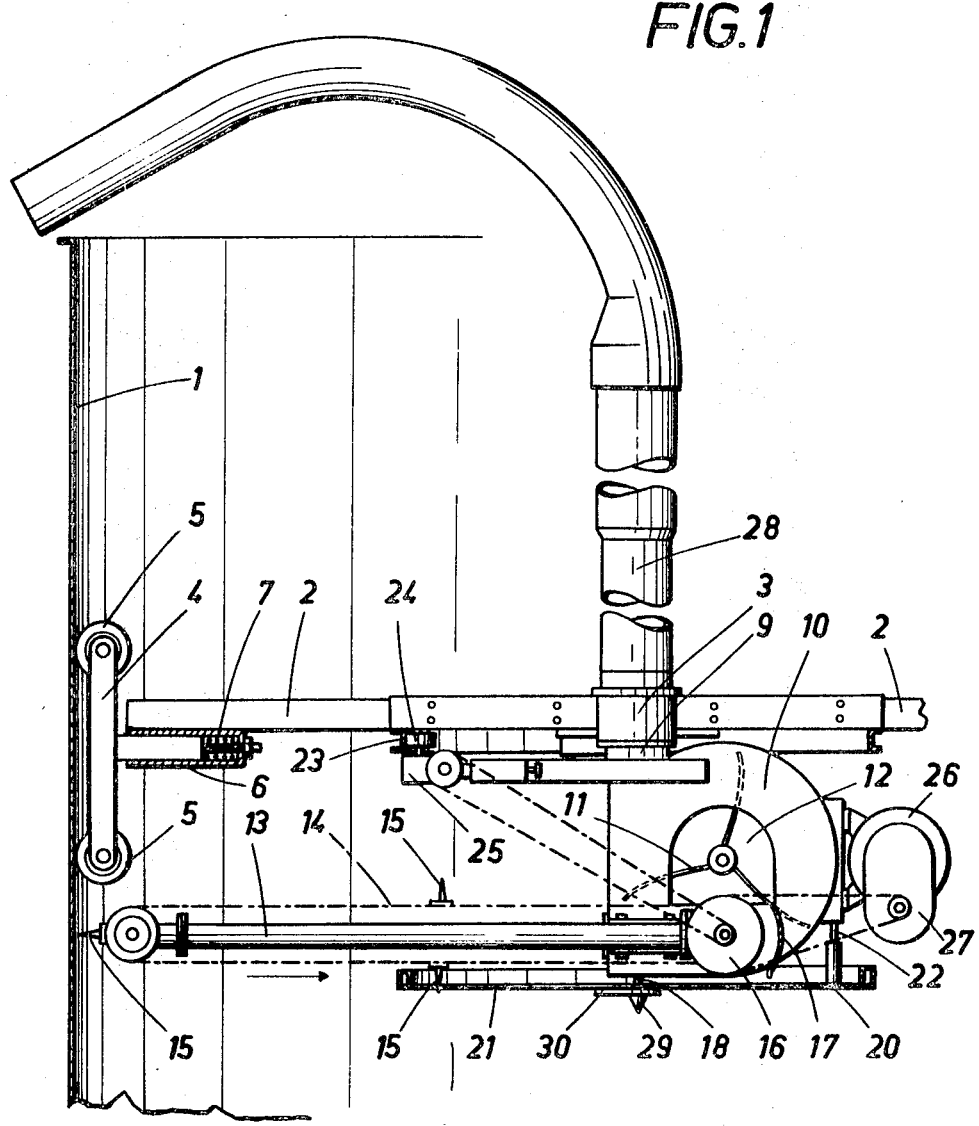
FIG. 1 is a side elevation showing a silage unloading apparatus mounted in a silo.

A silo for silage has a cylindrical sidewall 1 and contains a guide frame including a spider having at least three radial arms 2 and a hub 3. Pairs of rollers 5 are mounted in vertical crosspieces 4 at the ends of the radial arms 2. The crosspieces 4 are positively engaged and slidable in polygonal guide sleeves 6 and are loaded by springs 7, which urge the crosspieces outwardly to force the rollers 5 against the sidewall 1 of the silo. In the modification shown in FIG. 3, the springs 7 bear on an adjustable abutment 8 so that the initial stress of the springs 7 can be varied. As the apparatus is inserted into the silo, the crosspieces are held against the spring force by crosspins in the guide sleeves 6. With this design, the guide spider 2, 3 can be lowered and lifted in the silo but cannot rotate about the axis of the silo and remains in its horizontal position. The crosspieces 4 and rollers 5 could be replaced by skids.

The hub 3 forms the bearing for rotatably mounting the neck 9 of the housing 10 of a blower. That bearing may be provided with rollers or other rolling elements, if desired. The blower has an impeller 11 and an inlet 12. The carrier 13 of a chain conveyor 14 may be, e.g., tubular and is rigidly and easily detachably connected to the blower housing. The conveyor 14 may consist of a single chain or a double chain and carries teeth 15, which are individually arranged or form pairs of juxtaposed teeth. The conveyor is disposed laterally of the blower housing and its direction of travel is transverse to the axis of the impeller 11 of the blower. The material is conveyed by the lower course of the chain inwardly toward the center and within a guard 17 is elevated around the driving and reversing sprocket 16 and adjacent to the upper course of the chain is laterally delivered into the inlet 12 of the blower. The guide spider 2, 3 is supported on the blower housing 10 by the radial and thrust bearing for the neck 9 of the blower housing. The latter is supported on a support consisting of plate 20 by a pin 18 having a ball head (FIG. 3). The ball head 19 is mounted in a complementary socket of the baseplate 20 to form a universal or ball-and-socket joint so that the latter can assume any desired inclination in all directions relative to the blower housing and rests on the material in storage in the silo. The baseplate is provided with an aperture 21 through which the teeth 15 of the chain conveyor 14 can extend. The blower housing 10 and the baseplate 20 are coupled by a coupling pin 22 for joint rotation in the hub 3 of the guide spider 2, 3. The entire apparatus can quickly be knocked down into individual parts, namely, the baseplate, the carrier with the conveyor chain, the blower and the guide frame.

Figure 2:
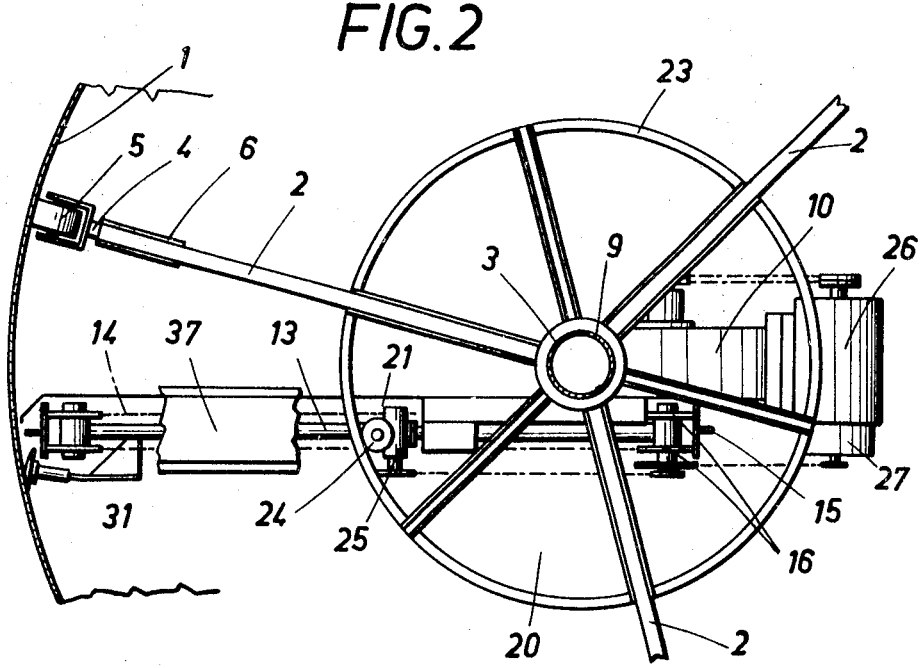
FIG. 2 is a top plan view of the apparatus.
Figure 4:
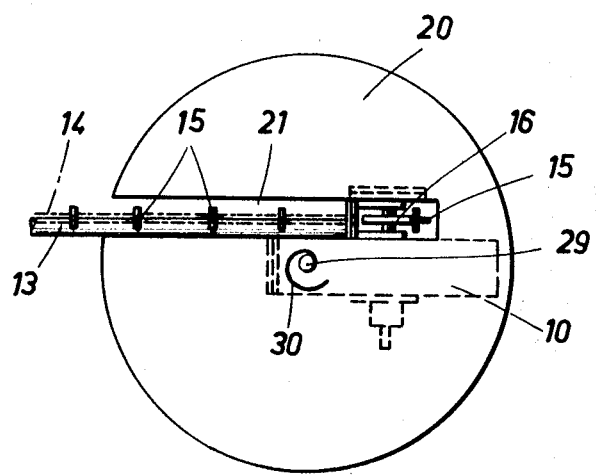
FIG. 4 is a bottom view showing the support.

FIGS. 1 and 2 show that the guide spider 2, 3 is provided with a friction ring 23, with which a friction wheel 24 is in rolling engagement. The friction wheel 24 is driven by a worm gear unit 25. The overall drive is effected by a motor 26, which is secured to the blower housing 10 and which drives the impeller and through the intermediary of a reversing transmission 27 drives the chain conveyor. The drive for the worm gear unit 25 is derived from the drive sprocket of the chain conveyor. The rolling of the friction wheel 24 on the friction ring 25 imparts a rotation about the axis of the silo to all parts of the apparatus which are disposed below the guide spider 2, 3, inclusive of the baseplate 20, which is coupled to the blower housing by the driver pin 22. At the same time, the chain conveyor 14 is driven in the direction of the arrow, i.e. radially inwardly and the impeller 11 is rotated. The silage entrained by conveyor teeth 15 is moved by the impeller into a telescopic pipe or a flexible tube 28 above the top rim of the silo, where it is ejected.

The baseplate 20 carries on its underside a centering spike 29, whence extends a spirally curved web 30 which during the rotation of the plate pushes the material from the central region into the working range of the chain conveyor 14. At the outer end of the conveyor, an inclined disc 31 is provided, which has a crowned surface hugging the sidewall 1 of the silo so that the material disposed near the sidewall of the silo can also be pushed toward the conveyor.

Figure 5:
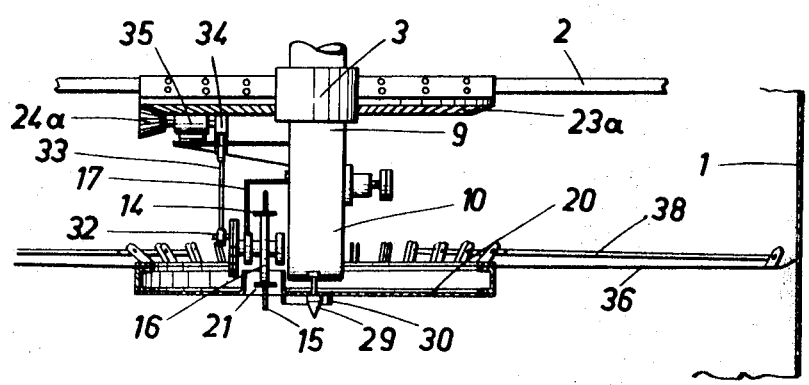
FIGS. 5 and 6 are, respectively, a side elevation and top plan view showing the most important parts of the apparatus as well as the baseplate and flexible cover.
Figure 6:
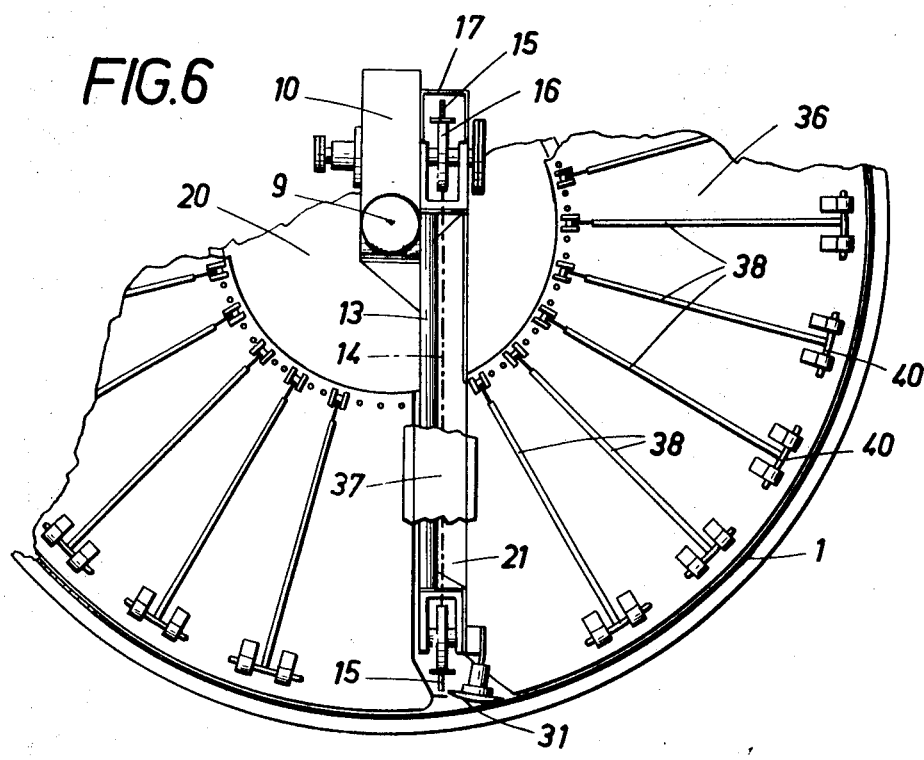
Figure 7:
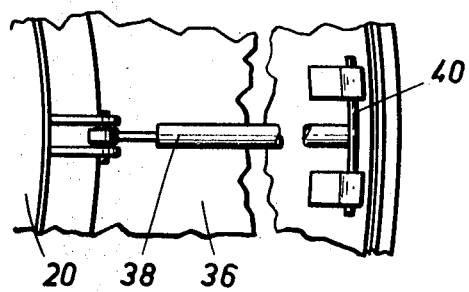
FIGS. 7 and 8 are, respectively, a top plan view and a vertical sectional view showing associated details.
Figure 8:
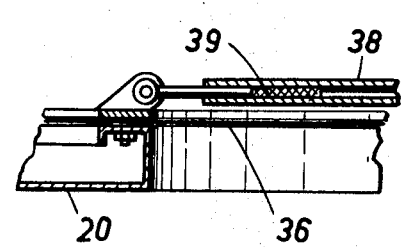

In the modification shown in FIG. 3, the friction ring 23 is replaced by a gear ring 23a, which is in mesh with a pinion 24a (see also FIG. 5). An eccentric pin 32 is firmly connected to the drive sprocket of the chain conveyor 14 and by means of a connecting rod 33 and a crank arm 34 operates a stepping gear unit 35 for driving the pinion 24a.

In accordance with FIGS. 5–8, a flexible cover or tarpaulin 36 is secured to the outer edge of the baseplate 20 and tightly contacts a cover 37 for the conveyor 14. The edge of the flexible cover 36 contacts the sidewall 1 of the silo. Radial telescopic ribs 38 are pivoted to the baseplate 20 and serve to stretch the flexible cover 36 like an umbrella. These ribs 38 tend to extend under spring pressure or the pressure of a rubber insert 39 and have crossbeams 40, which engage the flexible cover 36. Alternatively, the plate 20 itself may extend to the sidewall of the silo and may be provided with an elastic profiled edge portion. In that case, however, the plate must be articulated to facilitate its introduction into the silo.

Figure 9:
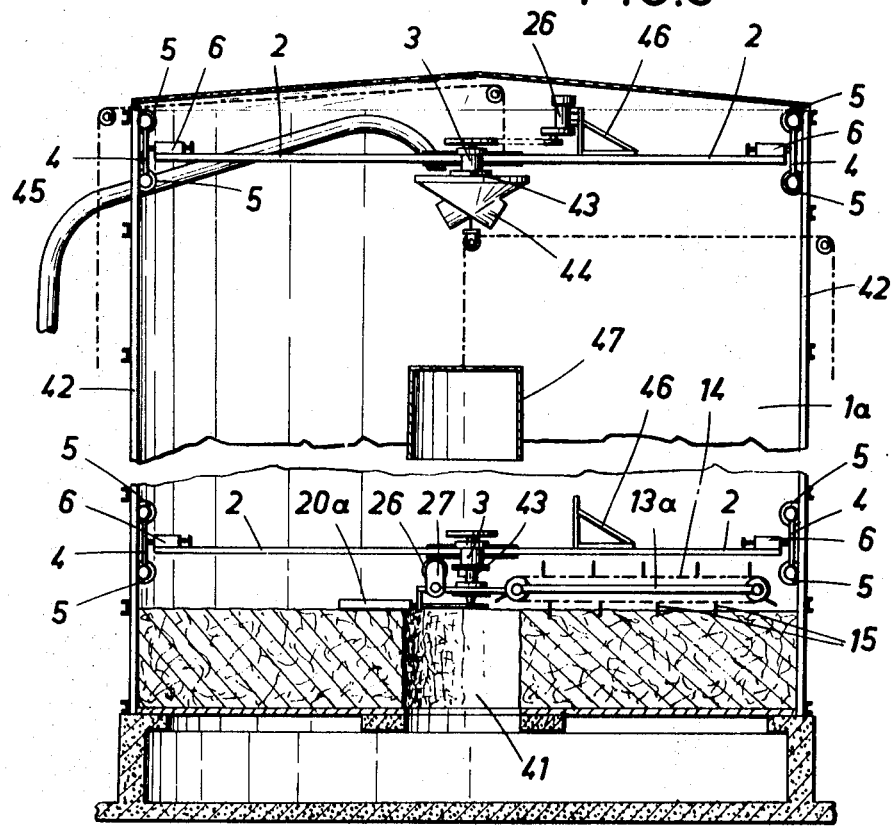

The embodiment shown in FIGS. 9 and 10 is intended for a hay tower, in which a central dropping well 41 is left in the material in storage. In this case, the support consists of segmentlike plate elements 20a, which have upturned radial edges to facilitate the sliding on the surface of the material in storage. The guide frame consists again of radial arms 2 having crosspieces 4 and rollers 5 and a hub 3, which are guided for vertical movement only and against rotation in the vertical standards 42 of the sidewall 1a of the tower. The carrier for the chain conveyor consists of a shaft 43, which is mounted in the hub 3, and a radial arm 13a, which can be detached from the shaft, whereas the latter remains in the hub 3. Rotation is imparted to the conveyor by the same means as in FIGS. 3 and 5. When it is desired to fill the hay tower, the arm 13a together with the chain conveyor is removed and the guide spider 2, 3 is pulled up into the upper portion of the tower. This is shown in the top part of FIG. 9. The motor 26 s detached from the arm 13a and secured to a frame 46 of the guide spider. Finally, a distributor 44 is flanged through a pipe 45. To leave a well, a bell 47 is centrally suspended and pulled up as the material in storage is built up. The distributor 44 is driven by a motor 26 through the intermediary of the shaft 43.

In the embodiment shown in FIGS. 11–13, the conveyor consists of metal slats 14a, which are directly hinged together and have hinge eyes 48, 49, which are disposed on the outside of the slat and serve as flights. The driving and reversing pulleys consist of two square discs 16a having a side length that is equal to the slat length. Alternate slats 14a carry on the inside a U-shaped guide extension 50, which holds a tooth 15, which extends through the respective slat. The guide extension 50 is guided between guide bars 51, which are secured to the carrier 13. Instead of one disc 16a, two such discs, which are suitably spaced apart, might be arranged one beside the other. In this case, the guide extensions 50 pass between such discs. On the other hand, an individual disc 16a is sufficient and will facilitate the self-cleaning action of the conveyor. In order to ensure a satisfactory revolution of the conveyor, the two discs 16a are staggered relative to each other by an angle of 45°.

Figure 15:
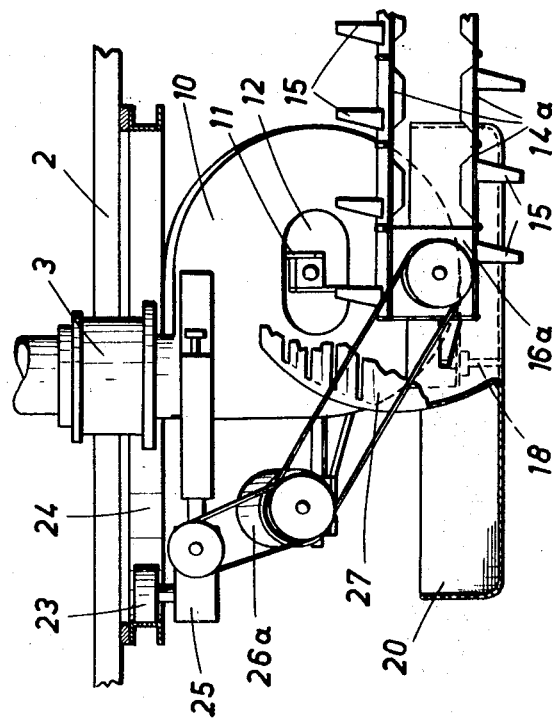
FIGS. 14 and 15 are, respectively, a vertical sectional view and a side elevation showing a different embodiment of the invention.
Figure 14:
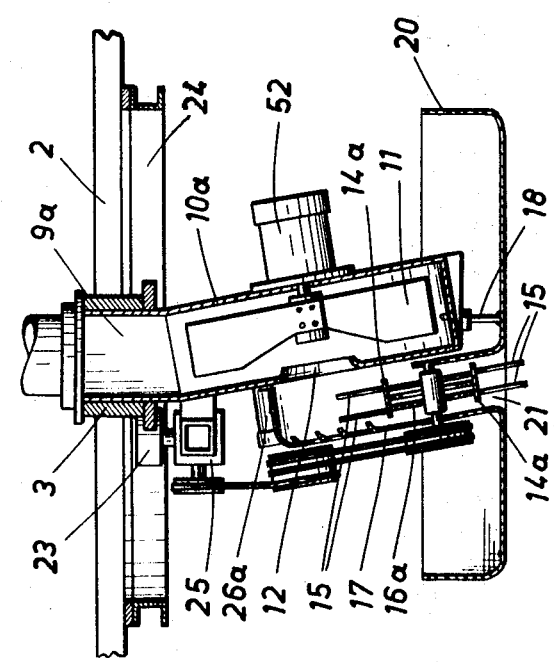

In the embodiment shown in FIGS. 14 and 15, the blower housing 10a is inclined from its neck 9a, which is rotatably mounted in the bearing 3 of the guide spider 2, 3. The axes of the driving and reversing pulleys 16a of the conveyor consisting of hinged slats 14a have the same inclination as the axis of the impeller of the blower so that the teeth 15 of the conveyor move through the space below the neck 9a of the blower. By means of the threaded bolt 18, the baseplate 20 is vertically adjustably secured to the blower housing 10a so that the depth of penetration of the teeth 15 into the material in storage can be varied. Finally, a separate drive motor 52 is provided for the blower and another motor 26a serves to drive the conveyor and to rotate the assembly in the bearing 3.

What I claim is:

1. A silage unloading apparatus for mounting on top of the silage in a silo having a vertical sidewall about an axis of the silo, which comprises
   1. a plate support adapted to rest on the silage and having an aperture,
   2. a silage conveying means carrier,
   3. a universal joint mounting the carrier on the plate support for limited pivotal movement of the carrier relative to the support in all directions, the plate support being connected to the carrier for rotation therewith,
   4. silage conveying means mounted on the carrier for rotation therewith and having silage entrainment elements extending through the plate support aperture into the silage,
   5. drive means operable to cause the conveying means to move the entrained silage,
   6. a guide frame disposed above the conveying means and guided for vertical movement on the inside surface of the silo sidewall,
   7. means holding the guide frame in a horizontal orientation and against rotation about the silo axis,
   8. a bearing mounting the silage conveying means carrier in the guide frame for rotation about the silo axis, and
   9. means for rotating the carrier, comprising a drive ring fixedly mounted on the guide frame concentrically about the silo axis, and a driven rolling element mounted on the carrier in driving engagement with the drive ring.

2. The silage unloading apparatus of claim 1, further comprising a blower mounted on the carrier for rotation therewith, the blower being arranged to receive the entrained silage from the conveying means and to discharge the silage in an upward direction.

3. The silage unloading apparatus of claim 1, wherein the drive ring is a gear ring and the rolling element is a pinion meshing with the gear ring.

4. The silage unloading apparatus of claim 2, wherein the carrier includes a blower housing and the housing has a neck rotatably received in the bearing.

5. The silage unloading apparatus of claim 4, wherein the housing is obliquely inclined in relation to the silo axis, the blower includes an impeller rotatable about an axis perpendicular to the direction of inclination of the housing, and the silage conveying means is arranged to entrain the silage in a path parallel to the direction of inclination of the housing towards the impeller.

6. The silage unloading apparatus of claim 2, wherein the silo sidewall has a top edge, and further comprising a flexible silage discharge hose connected to the blower and extending above the top edge of the silo sidewall.

7. The silage unloading apparatus of claim 2, wherein the silo sidewall has a top edge, and further comprising a telescopic silage discharge pipe connected to the blower and extending above the top edge of the silo sidewall.

8. The silage unloading apparatus of claim 1, further comprising means for adjusting the vertical distance between the plate support and the conveying means carrier.

9. The silage unloading apparatus of claim 1, wherein the guide frame comprises a plurality of radial arms having free outer ends, and said holding means comprises sets of two vertically spaced rollers mounted for rotation about horizontal axes on the outer ends of respective ones of the radial arms.

10. The silage unloading apparatus of claim 1, further comprising a cover over the conveying means, an annular flexible cover secured to the edge of the plate support and tightly contacting the conveying means cover, and radially outwardly urged, spring-loaded telescopic ribs connected to the flexible cover to force an outer edge portion of the flexible cover against the inside surface of the silo sidewall.

11. The silage unloading apparatus of claim 2, further comprising a centering spike on the underside of the plate support, the conveying means being arranged to move the entrained silage radially inwardly to an annular region concentrically surrounding the centering spike, and a spiral web extending from and about the centering spike to push the silage into the annular region.

12. The silage unloading apparatus of claim 1, wherein the conveying means carrier comprises a shaft rotatably mounted on the guide frame and a radial arm detachably mounted on the shaft, the silage conveying means comprises a conveyor chain and sprocket means about which the conveyor chain is trained, the sprocket means being mounted on the detachable radial arm, and the drive means comprises a motor detachably carried by said arm and operably connected to the sprocket means.

13. The silage unloading apparatus of claim 1, wherein the conveying means carrier comprises a shaft rotatably mounted on the guide frame and a radial arm detachably mounted on the shaft, the silage conveying means comprises a conveyor chain and sprocket means about which the conveyor chain is trained, the sprocket means being mounted on the detachable radial arm, and the drive means comprises a reversible motor detachably carried by said arm and operably connected to the sprocket means for selectively moving the silage in opposite directions, and further comprising a distributor detachably connected to the shaft for receiving entrained silage from the conveyor chain and distributing the same across the silo, and means for holding the guide frame in an upper, raised position in the silo.

14. The silage unloading apparatus of claim 1, wherein the silage conveying means comprises a series of metal slats having hinge eyes disposed on the outside of the slats and hingedly connecting the slats, at least alternate ones of the slats carrying a U-shaped guide extension on their insides, the silage entrainment elements including teeth carried by the slats carrying the U-shaped guide extension, the teeth extending through the slats and being retained by the extension, the carrier has mounted thereon laterally spaced guide bars guiding the guide extension therebetween, and square drive pulleys engaging the slats and having sides of the same length as the length of the slats.